United States Patent
Kim et al.

(10) Patent No.: US 12,186,923 B2
(45) Date of Patent: Jan. 7, 2025

(54) AUTONOMOUS DRIVING ROBOT CAPABLE OF OBSTACLE AVOIDANCE MOVEMENT

(71) Applicant: TWINNY CO., LTD., Daejeon (KR)

(72) Inventors: Yun Jeong Kim, Sejong (KR); Yong Jin Byeon, Daejeon (KR)

(73) Assignee: TWINNY CO., LTD., Daejeon (KR)

( * ) Notice: Subject to any disclaimer, the term of this patent is extended or adjusted under 35 U.S.C. 154(b) by 0 days.

(21) Appl. No.: 18/804,271

(22) Filed: Aug. 14, 2024

(65) Prior Publication Data
US 2024/0399591 A1   Dec. 5, 2024

Related U.S. Application Data

(63) Continuation of application No. PCT/KR2022/020206, filed on Dec. 13, 2022.

(30) Foreign Application Priority Data

Feb. 15, 2022   (KR) .................. 10-2022-0019769

(51) Int. Cl.
*B25J 9/16*   (2006.01)
*B25J 5/00*   (2006.01)

(52) U.S. Cl.
CPC .............. *B25J 9/1697* (2013.01); *B25J 5/007* (2013.01); *B25J 9/1664* (2013.01); *B25J 9/1676* (2013.01)

(58) Field of Classification Search
CPC ........ B25J 9/1697; B25J 5/007; B25J 9/1664; B25J 9/1676
See application file for complete search history.

(56) References Cited

U.S. PATENT DOCUMENTS

2022/0206468 A1*  6/2022  Cheon .................. G05D 1/0274

FOREIGN PATENT DOCUMENTS

| KR | 10-2006-0093964 A |   | 8/2006 |
|----|-------------------|---|--------|
| KR | 20060093964       | * | 8/2008 |
| KR | 10-2017-0043946 A |   | 4/2017 |
| KR | 20170043946       | * | 4/2017 |
| KR | 10-2049962 B1     |   | 11/2019 |

OTHER PUBLICATIONS

International Search Report (ISR) issued on Mar. 2, 2023, for International Application No. PCT/KR2022/020206.

* cited by examiner

*Primary Examiner* — Khoi H Tran
*Assistant Examiner* — Christopher Scott
(74) *Attorney, Agent, or Firm* — Studebaker & Brackett PC

(57) ABSTRACT

The present disclosure relates to an autonomous driving robot that can move without user intervention. The autonomous driving mobile robot able includes a PC that receives vision data from a vision device, sets a route, generates operation commands, and thereby controls a motor drive board and a power supply board, in which the PC is configured with a state determination module and a trajectory generation module and a state determination module determines whether the robot is at a location less than or equal to a first threshold distance from a destination is performed after determining a position and direction of the robot. When the robot is located at the location less than or equal to the first threshold distance from the destination, the trajectory generation module generates a stationary trajectory where the speed of the robot decreases and becomes zero as the robot approaches the destination.

3 Claims, 12 Drawing Sheets

FIG. 5
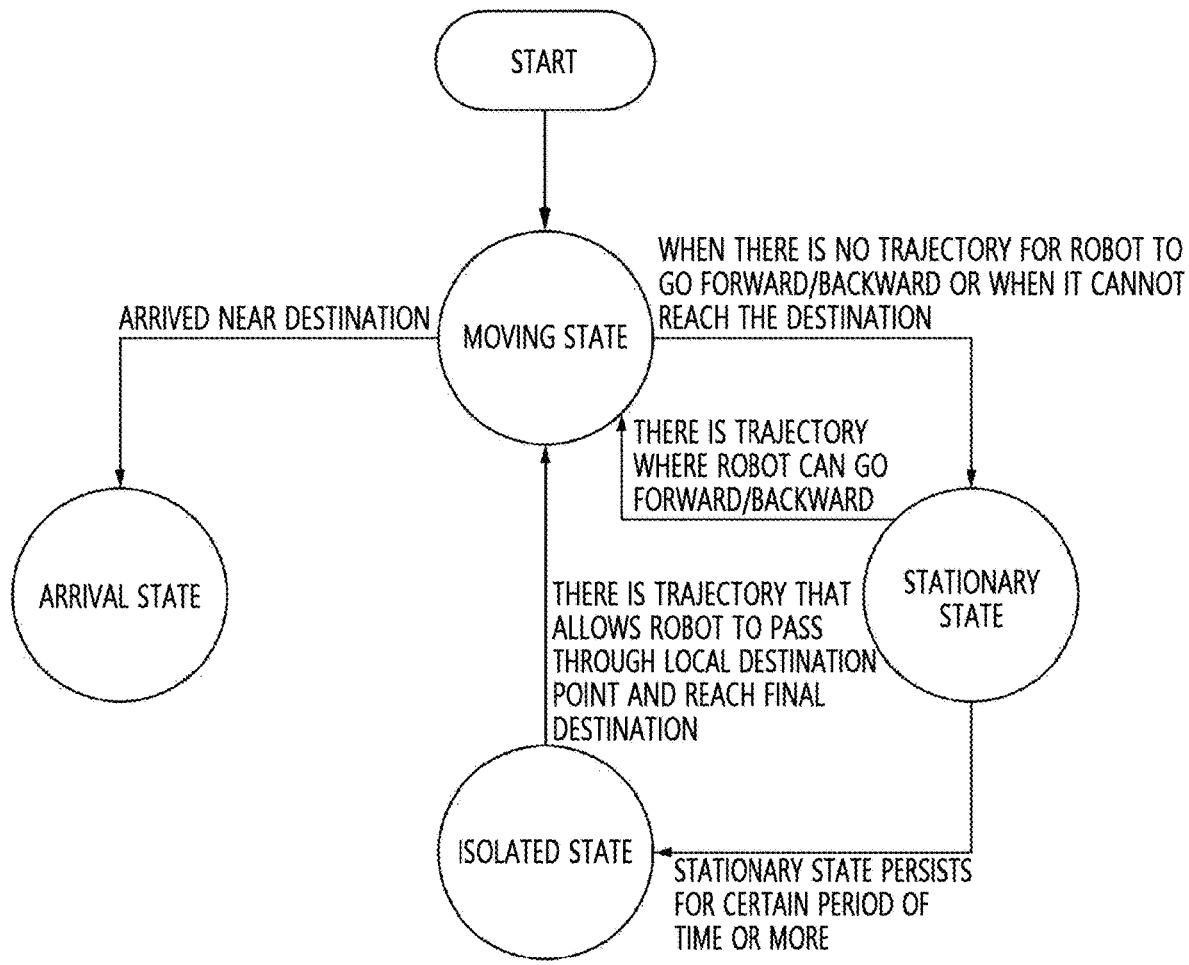
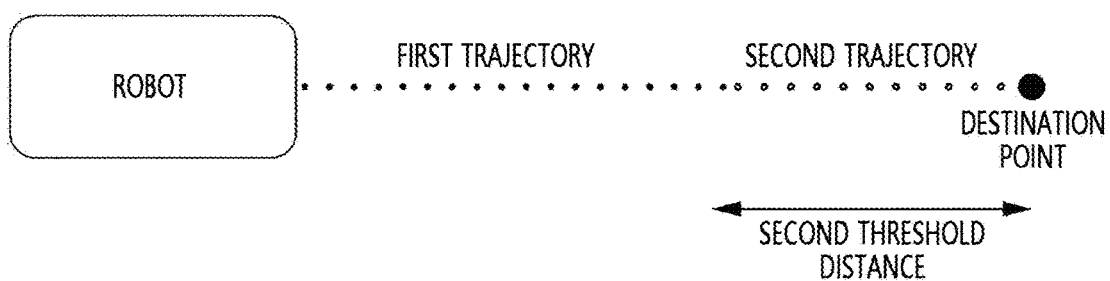

FIG. 12
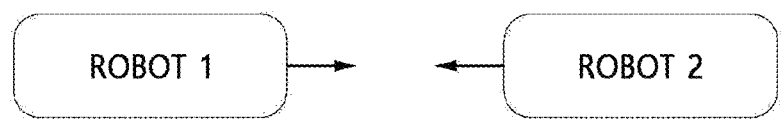
(a)
(b)
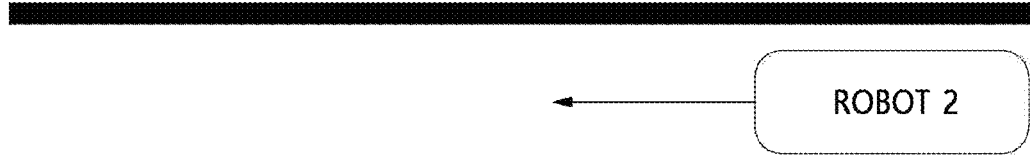
(c)

FIG. 13
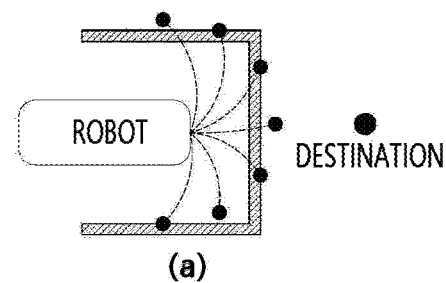
(a)
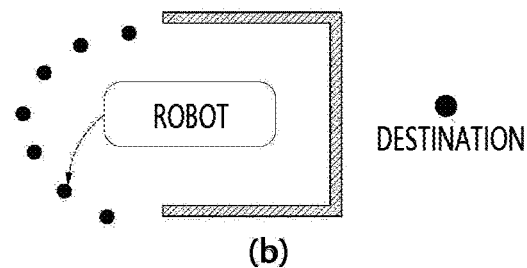
(b)
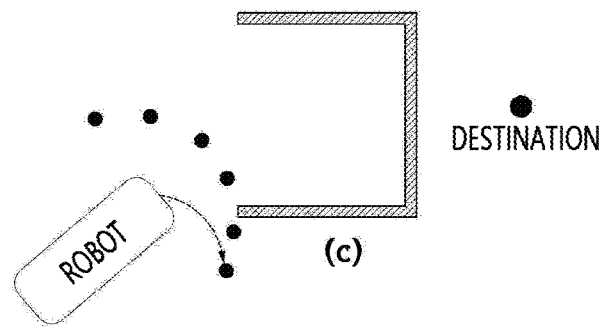
(c)
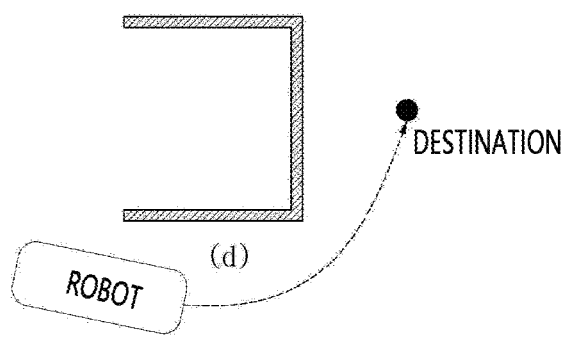
(d)

AUTONOMOUS DRIVING ROBOT CAPABLE OF OBSTACLE AVOIDANCE MOVEMENT

CROSS-REFERENCE TO RELATED APPLICATIONS

The present application is a continuation of International Patent Application No. PCT/KR2022/020206, filed Dec. 13, 2022, which is based upon and claims the benefit of priority to Korean Patent Application No. 10-2022-0019769, filed on Feb. 15, 2022. The disclosures of the above-listed applications are hereby incorporated by reference herein in their entirety.

TECHNICAL FIELD

The present invention relates to a robot, and more particularly, to an autonomous driving mobile robot that can move without user intervention.

BACKGROUND ART

Autonomous driving means that mechanical devices such as cars, airplanes, robots, etc. (hereinafter referred to as 'robots, etc.') travel freely by various self-installed sensors and computing systems without borrowing external forces, and representative examples thereof include unmanned cars, unmanned aerial vehicles, and robot travel.

Autonomous driving is generally performed in a way that, when a destination is input, a robot, etc. establishes global route planning, which is rough planning of an entire route from a starting point to a destination and establishes local route planning, which is a detailed route, by referring to various information sensed while moving along the global route planning, and thereby actual movement is performed. 'PTL 1' discloses the general concept of establishing such global planning and local planning, and in particular, specific methods for establishing the local planning are shown. FIG. 1 is a block diagram showing a configuration that enables autonomous driving of a robot.

The autonomous driving mobile robot is equipped with an overall map, and when a destination is input by the user, a global route planning unit derives waypoints from the starting point to the destination. That is, a line sequentially connecting the starting point—the waypoint—the destination becomes a global route. Next, the autonomous driving mobile robot maneuvers autonomously while sequentially moving through local sections from the starting point-first waypoint-second waypoint to the destination. During this process, necessary information is collected by environmental recognition sensors such as cameras and LiDAR to recognize a local environment and is reflected in establishing the local route planning. Then, autonomous driving to the destination is implemented by controlling the robot to take the local route according to the established local route planning.

The field of interest of the present invention relates to the local route planning. FIG. 2 is a flowchart of a local planning establishment method disclosed in PTL 1, and may be regarded as an example of the local route planning method.

The local planning establishment method shown in FIG. 2 is an incremental planning method, and is a method that allows the robot to generate a best trajectory and move without modifying the global planning route as much as possible by having the robot select an input that minimizes a given cost function without colliding with obstacles at each time step the trajectory is planned. However, this method has the problem in that the robot may be isolated because it cannot generate a trajectory without collisions with an obstacle in the current time step due to the selection made in the previous time step, or it may generate an inefficient trajectory even though there is no collision with an obstacle in the trajectory, and the robot falls into a state that is no different from isolation by repeating unnecessary movements by repeatedly performing avoidance algorithms when there is an obstacle near the destination.

Although a local route planning method using a sampling-based optimal tree that enables real-time route planning by excluding state values corresponding to input values that the robot cannot select from calculations and reducing the number of nodes that require calculation by sampling a portion of a set of state values that can be realized by the robot has been proposed, it requires a lot of calculation time in actual implementation, and there is a problem (local minima) that makes it difficult to find the optimal trajectory just by changing a weight of each parameter in a given cost function.

In addition, most local route planning methods, including conventional local route planning methods, have the problem of requiring a lot of calculation time because, when generating a route, a state of the robot and the surrounding environment are considered at each type step to determine the state of the robot at the next time step and thereby generate a movement route.

Technical Problem

The present invention has been devised to solve the problems described above, and the problem to be solved by the present invention is to provide an autonomous driving mobile robot that can generate an optimal local route with a small amount of calculation and is able to move by avoiding an obstacle, including avoiding isolation of the robot.

Technical Solution

An autonomous driving mobile robot able to move by avoiding an obstacle according to the present invention is configured with a motor, a motor drive board that controls the motor, a battery, a power supply board that controls the battery, a vision device that acquires surrounding vision data, and a PC that receives the vision data from the vision device, sets a route, generates operation commands, and thereby controls the motor drive board and power supply board, in which the PC is configured with a state determination module and a trajectory generation module and the state determination module performs an arrival determination step of determining whether the robot is at a location less than or equal to a first threshold distance from a destination is performed after performing a robot state determination step of determining a position and direction of the robot, and if the robot is located at the location less than or equal to the first threshold distance from the destination, the trajectory generation module performs a stationary trajectory generation step to generate a stationary trajectory where the speed of the robot decreases and becomes 0 as the robot approaches the destination.

Advantageous Effects

The autonomous driving mobile able to move by avoiding an obstacle according to the present invention can stop as close to the destination as possible without repetitive avoidance movements even if there are obstacles around the destination.

In addition, even if it is impossible to form a trajectory up to the destination due to obstacles, a collision avoidance destination point is set to give the possibility of a new trajectory search. In addition, if the robot is isolated, the robot can escape the isolation by setting an isolation avoidance destination point and generating an avoidance trajectory.

BRIEF DESCRIPTION OF THE DRAWINGS

FIG. 5 is a transition diagram of four states defined in the present invention.

FIG. 12 is an example diagram of a case where two robots face each other.

FIG. 13 is an example diagram showing the setting of the isolation avoidance destination point and the movement of the robot accordingly.

DETAILED DESCRIPTION

Hereinafter, the autonomous driving mobile able to move by avoiding an obstacle according to the present invention will be described in detail with reference to the accompanying drawings.

Figure 1:
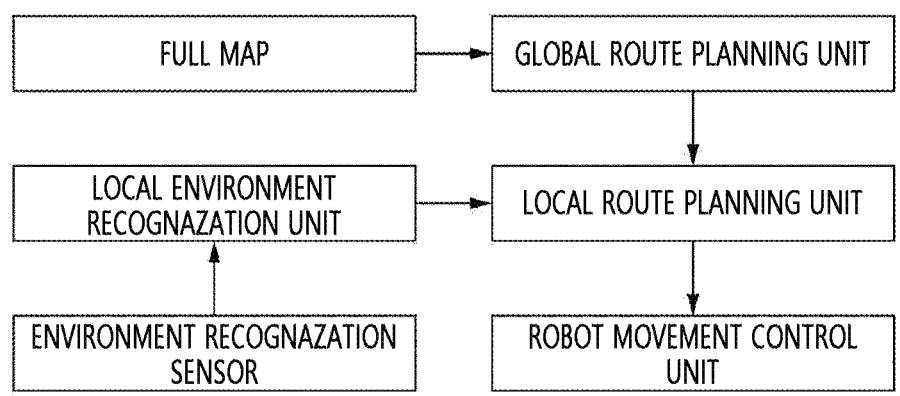
FIG. 1 is a block diagram showing a configuration that enables autonomous driving of a robot.
Figure 2:
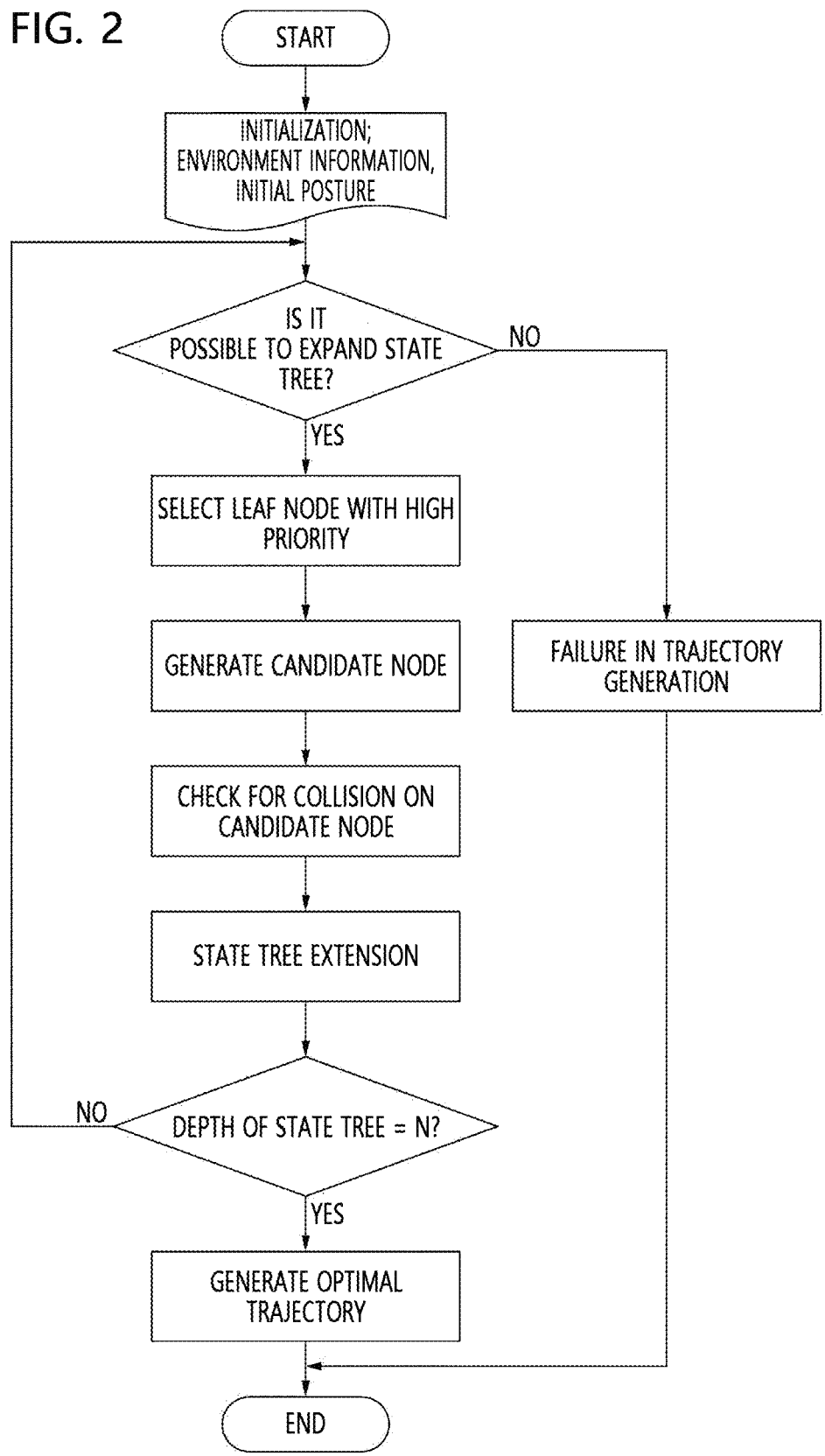
FIG. 2 is an example of a local planning establishment method.
Figure 3:
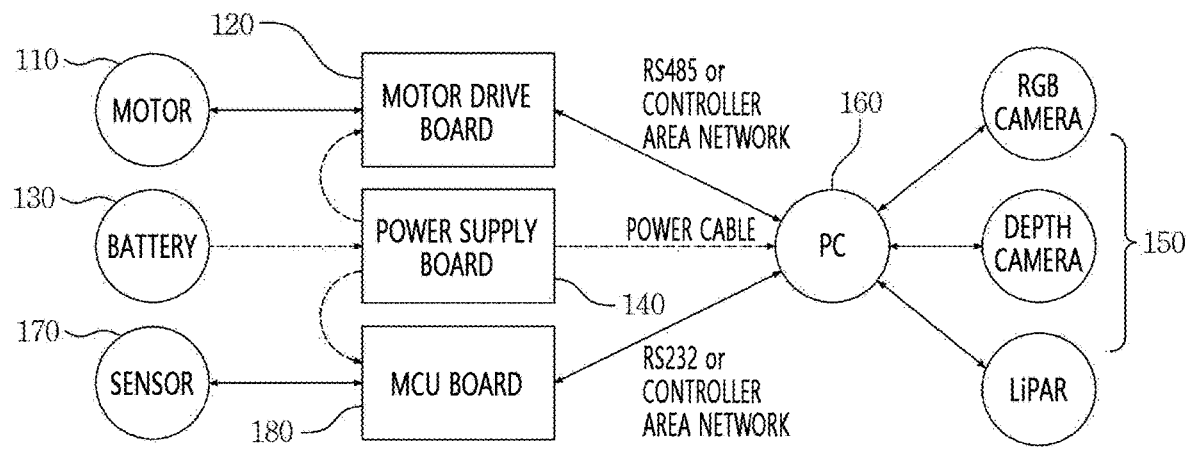
FIG. 3 is a configuration diagram of an autonomous driving mobile able to move by avoiding an obstacle according to the present invention.

FIG. 3 is a configuration diagram of an autonomous driving mobile able to move by avoiding an obstacle according to the present invention. The autonomous driving mobile able to move by avoiding an obstacle according to the present invention is configured with a motor 110 that generates motion necessary for the movement of a robot, such as a wheel or an endless track, a motor drive board 120 that controls the motor 110, a battery 130, a power supply board 140 that controls the battery, a vision device 150 for acquiring surrounding vision data, and a PC 160 that receives vision data from the vision device 150, sets a route, generates operation commands, and thereby controls the motor drive board 120 and the power supply board 140. The autonomous driving mobile robot may be configured to further include a sensor 170 such as an infrared sensor or an ultrasonic sensor, and an MCU board 180 that collects data sensed by the sensor 170. Data and control commands can be transmitted and received between the PC 160, the motor drive board 120, and the MCU board 180 through methods such as RS232 or CAN communication.

The PC 160 recognizes an obstacle from the vision data, estimates a local location of the robot, derives a local trajectory, and then controls the motor drive board 120, the power supply board 140, etc. to move the robot. The derivation of the local trajectory may be performed through firmware or software, but in the present invention, it is approached as a module (may be implemented in hardware or software, but since they are the same in terms of technology, there is no distinction) concept without distinguishing between firmware and software.

Figure 4:
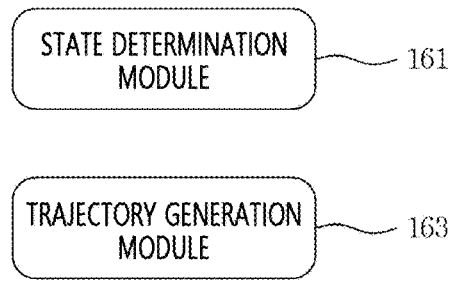
FIG. 4 is a set of modules that derives local trajectories in a PC.

FIG. 4 is a configuration diagram of a set of modules that derives local trajectories in the PC. In the present invention, the PC 160 is configured with a state determination module 161 and a trajectory generation module 163.

The state determination module 161 is a component that determines a state of the robot, and determines the state of the robot as one of a moving state, a stationary state, an isolated state, and an arrival state. The moving state is a state in which a robot's position movement is in progress and the robot's speed is not 0, and the stationary state is a state in which the robot does not move its position momentarily, and is a state in which it is determined that the robot cannot reach its destination because there is no trajectory that allows the robot to move forward or backward or there is an obstacle around the destination. The isolated state is a state in which the stationary state lasts for a predetermined period of time, for example, 2 to 3 seconds, and the arrival state is a state in which the robot has reached a predetermined distance near the destination. The distinction between the stationary state and the isolated state can be performed based on a predetermined time. For example, if a robot is stopped for less than 2 seconds, it can be defined as the stationary state, and if the robot is stopped for more than 2 seconds, it can be defined as the isolated state.

FIG. 5 is a transition diagram of the four states defined in the present invention. If there is no trajectory that allows the robot to go forward or backward in the moving state or the destination cannot be reached, the state may transition to the stationary state. If a trajectory that allows the robot to go forward or backward is generated before transitioning from the stationary state to the isolated state (such as when an obstacle moves), the state may transition back to the moving state. If the stationary state continues for a certain period of time, the state transitions to a state where the robot has nowhere to go, that is, it transitions into the isolated state. If the robot does not find a means of escaping from the isolated state, the robot will have no choice but to stay in one spot as long as there are no changes in external conditions such as moving an obstacle. In this case, if the means of escaping from the isolated state can be found, the state can be transitioned back to the moving state. The core technical idea of the present invention is related to escaping from this isolated state. If the robot is determined to be at a location within a predetermined distance (hereinafter referred to as 'first critical distance', usually given as a design variable) from the destination, the state transitions from the moving state to the arrival state, and all transitions are terminated.

The motion according to this state transition of the robot is defined as a trajectory. A destination trajectory is the entire trajectory from the robot's current position to the destination, and is a trajectory in which the state transitions to the arrival state through a combination of the moving state, stationary state, and isolated state. In addition, the destination trajectory is divided into two, and the trajectory close to the robot is called a first trajectory, and the trajectory close to the destination is called a second trajectory. The destination trajectory is divided into two at an intersection point of the destination trajectory and a circle with a predetermined radius (hereinafter referred to as 'second critical distance', given as a design variable) from the destination. A stationary trajectory is a trajectory in which the robot moves from the moving state to the arriving state, in which, as the robot approaches the destination, its speed gradually decreases and eventually reaches 0 at or around the destination. An avoidance trajectory is defined as a trajectory in which the robot moves to a local destination point by searching for the local destination point where no collision occurs first when there is no destination trajectory.

Figure 6:
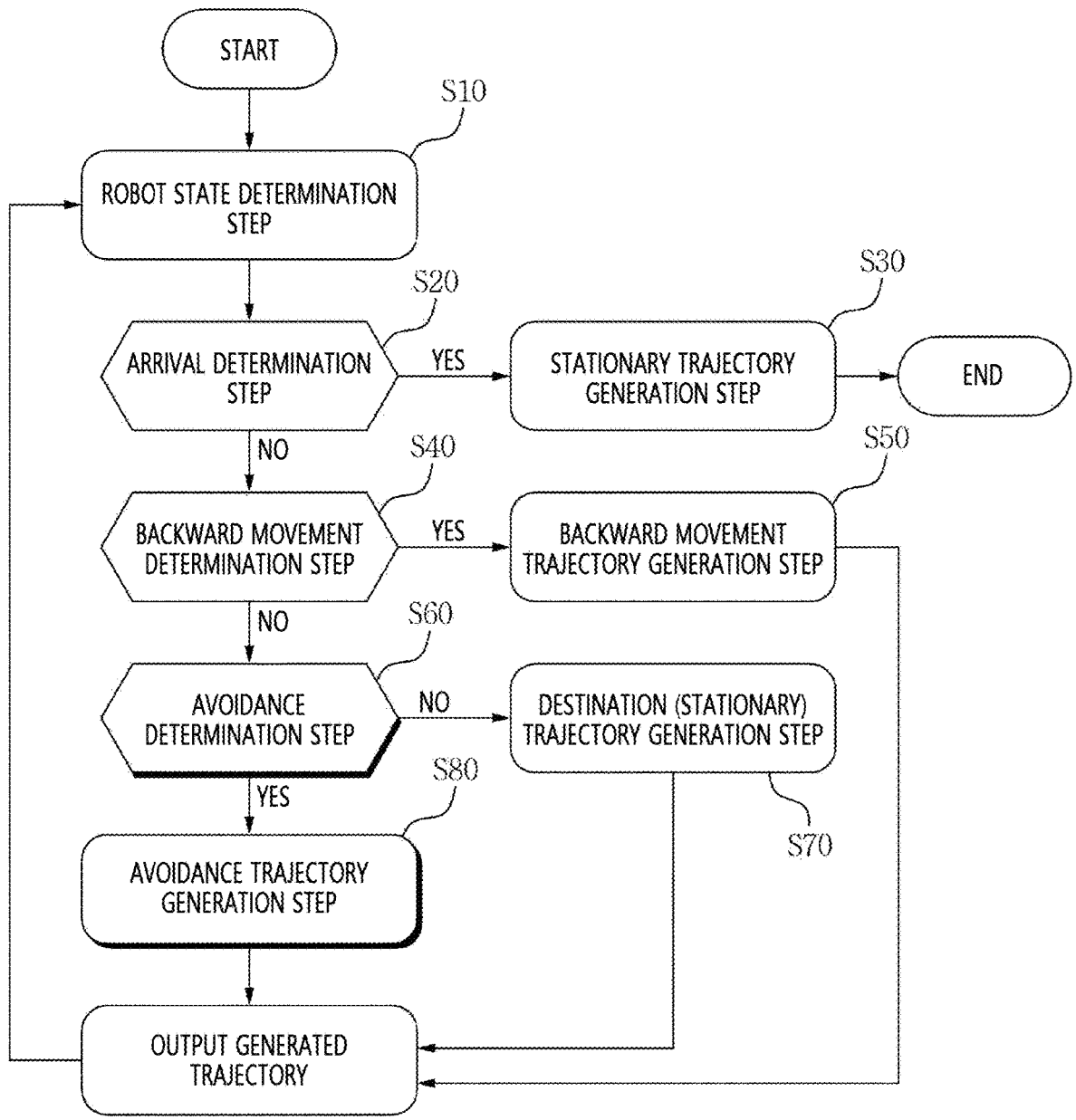
FIG. 6 is a flowchart of the autonomous driving mobile able to move by avoiding an obstacle generating a trajectory.

FIG. 6 is a flowchart of an autonomous driving mobile able to move by avoiding an obstacle generating a trajectory, in which a robot state determination step S10, an arrival determination step S20, a backward movement determination step S40, and an avoidance determination step S60 are performed by the state determination module 161, and a stationary trajectory generation step S30, a backward movement trajectory generation step S50, a destination trajectory generation step S70, and an avoidance trajectory generation step S80 are performed by the trajectory generation module 163.

First, the robot state determination step S10 is a step of determining the state of the robot by further including a position and direction of the robot, preferably angular velocity and linear velocity, where the position and direction are directly related to trajectory generation, and the angular velocity and linear velocity affect the possibility of trajectory generation in relation to the robot's locomotion capabilities. For example, a trajectory that can be generated at a specific angular or linear velocity may not be able to be generated at a different angular or linear velocity.

The arrival determination step S20 is a step of determining whether the robot is at a location less than or equal to the first threshold distance from the destination. If the robot is at the location less than or equal to the first threshold distance from the destination, the trajectory generation module 163 performs the stationary trajectory generation step S30 to generate the stationary trajectory and ends the movement so that the robot can approach as close as possible to the destination even if it does not exactly match the destination.

The backward movement determination step S40 is a step to determine whether a destination trajectory is generated toward the rear of the robot (90 to 270° when measuring the angle counterclockwise when the front of the robot is set to) 0°. Since the robot usually moves forward, it is not common for the destination trajectory to be generated backwards, but if moving backwards is advantageous, there is no need to rule it out, and thus the necessity of moving backwards is determined first. If it is determined that backward movement is necessary, the trajectory generation module 163 performs the backward movement trajectory generation step S50 to generate a backward movement trajectory, and the robot moves along the backward movement trajectory.

Next, in the avoidance determination step S60, it is determined whether the destination trajectory cannot be generated. If a destination trajectory cannot be generated, that is, if there is no trajectory in which the robot can reach the destination without colliding with an obstacle, the approach is to generate a local destination point, which is another waypoint, to avoid collisions, and to determine whether or not the robot reaches the destination point from the local destination point again. Therefore, if the avoidance is not necessary, the trajectory generation module 163 performs the destination trajectory generation step S70 to generate the destination trajectory and the robot moves accordingly. In this case, if the robot's speed monotonically decreases, the destination trajectory becomes the stationary trajectory. If the avoidance is necessary, the trajectory generation module 163 performs the avoidance trajectory generation step S80 to set a local destination point and generate an avoidance trajectory reaching the local destination point.

Figure 7:
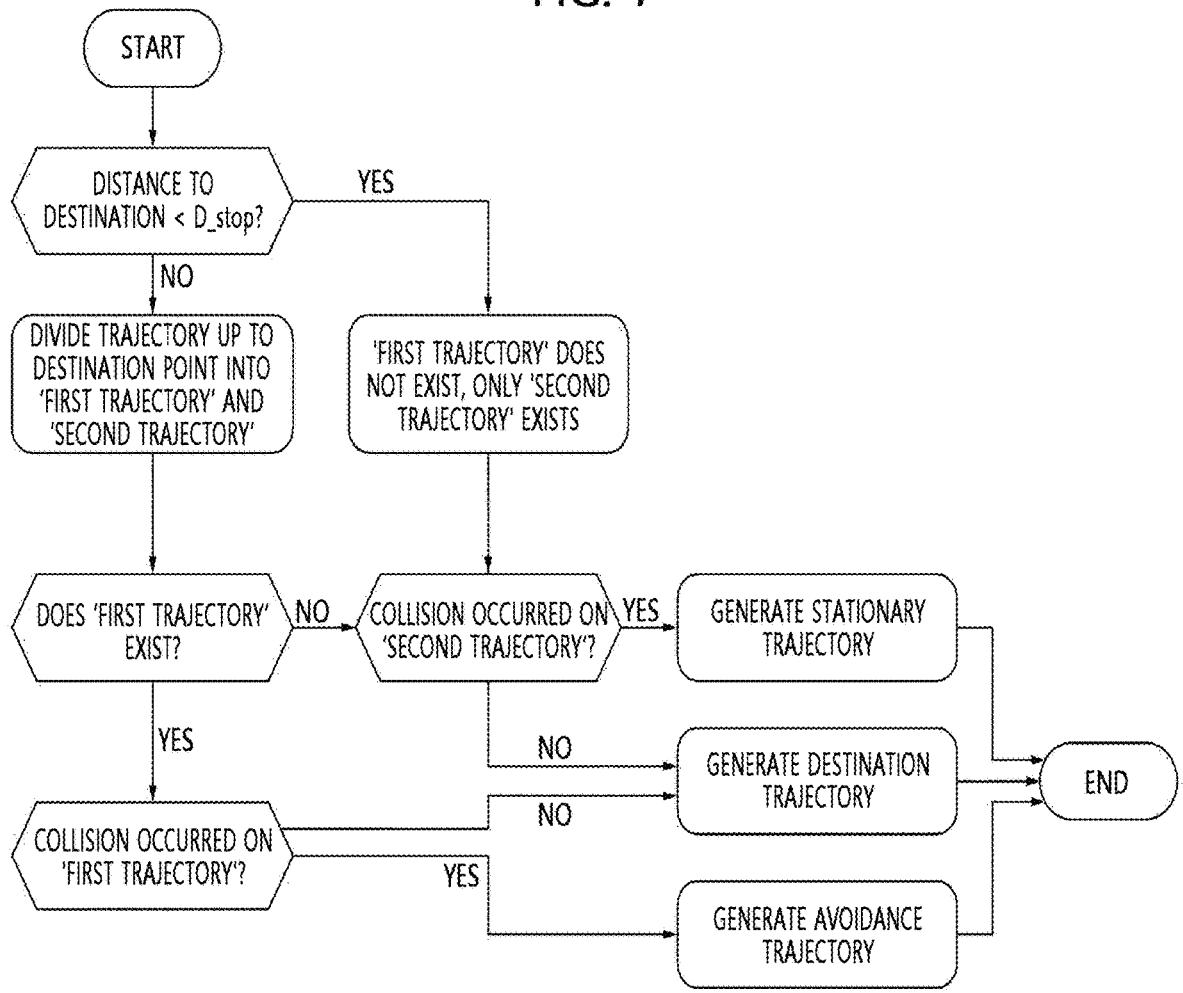
FIG. 7 is an algorithm from a perspective of collision occurrence for the trajectories generated in FIG. 6.

FIG. 7 shows an algorithm from a perspective of collision occurrence for the trajectories generated in FIG. 6. If a distance to the destination is less than or equal to a predetermined third threshold distance D_stop which is less than or equal to the first threshold distance, only the second trajectory exists. Even if a collision occurs in the second trajectory, a stationary trajectory is generated and the robot is moved as close to the destination as possible. If the collision does not occur in the second trajectory, a destination trajectory is generated and the robot is moved to the destination. If the distance to the destination exceeds the third threshold distance D_stop, a destination trajectory is generated, and the second trajectory is distinguished from the destination trajectory. In this case, the first trajectory may or may not be present. If an end of the first trajectory is between a circle having a radius of the third threshold distance and a circle having a radius of the first threshold distance, the first trajectory is not generated. If the end of the first trajectory is outside the circle whose radius is the first threshold distance, the first trajectory is generated. The case where there is no first trajectory is the same as the case where there is only the second trajectory described above. When the first trajectory is present, if the collision does not occur in the first trajectory, a destination trajectory is generated, and if the collision occurs, an avoidance trajectory is generated. Accordingly, if the collision does not occur in the first trajectory, first, the robot can move up to an end point of the first trajectory, and even if the collision occurs, the robot can at least move to the local destination point according to the avoidance trajectory. Through this process, when there is an obstacle near the destination, it is possible to generate a trajectory that the robot stops near the destination rather than repeatedly generating an avoidance trajectory near the destination.

Next, the local destination point for generating the avoidance trajectory is described. The local destination point may be divided into a collision avoidance destination point set to avoid a collision with an obstacle and an isolation avoidance destination points to resolve isolation. First, description is made in relation to the collision avoidance destination point.

Figure 8:
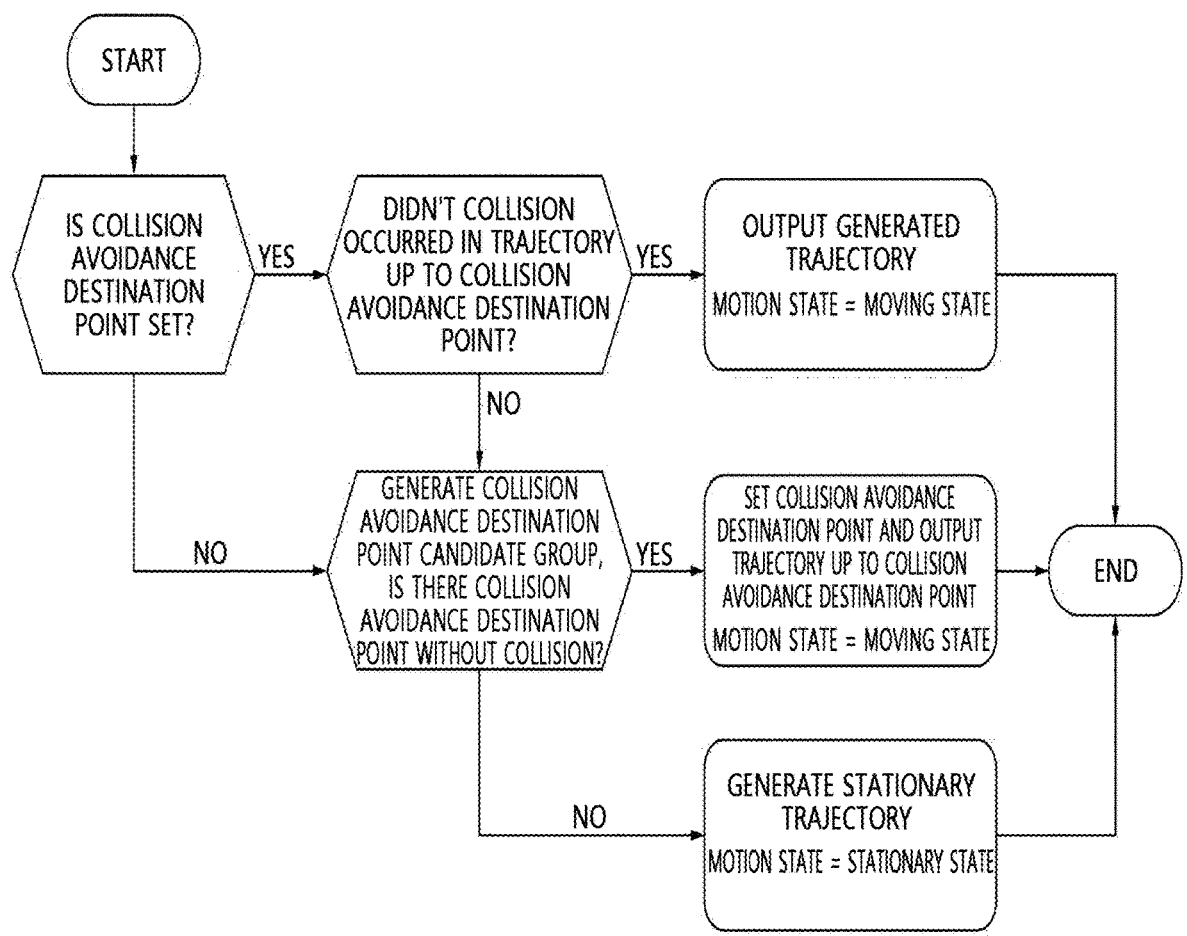
FIG. 8 is an algorithm for generating and setting a collision avoidance destination point and a state of the robot related thereto.

The collision avoidance destination point is generated in the avoidance trajectory generation step S80 of FIG. 6 by the trajectory generation module 163, and generation or setting of the collision avoidance destination point is performed when the robot is in the moving or stationary state. FIG. 8 shows an algorithm for generating and setting a collision avoidance destination point and the state of the robot related thereto. The movement of the robot may be based on the destination trajectory or the avoidance trajectory. When the collision avoidance destination point is set by the trajectory generation module 163, if there is no collision with an obstacle up to the collision avoidance destination point, the robot may maintain its moving state according to the generated trajectory. If this is not the case, that is, if the collision avoidance destination point is set, but the robot is expected to collide with an obstacle up to the collision avoidance destination point, or the collision avoidance destination point is not set, the collision avoidance destination point should be generated. In this case, it is necessary to generate multiple candidate groups that can become collision avoidance destination points, select one of the destination points with no collisions among the multiple candidate groups up to the collision avoidance destination point, set the collision avoidance destination point, and maintain the moving state. If there is no destination point with no collisions up to the collision avoidance destination point among the multiple candidate groups, the robot transitions to the stationary state.

Figure 9:
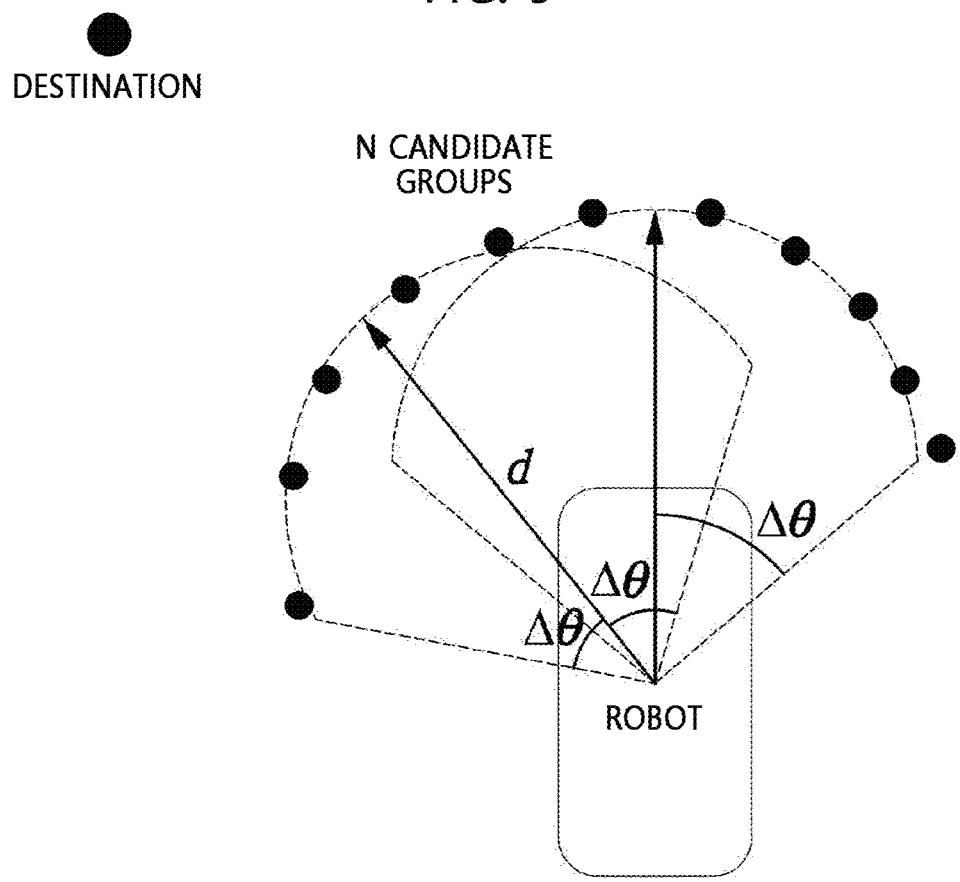
FIGS. 9 and 10 are example diagrams showing a robot, a destination, and a collision avoidance destination point candidate group.
Figure 10:
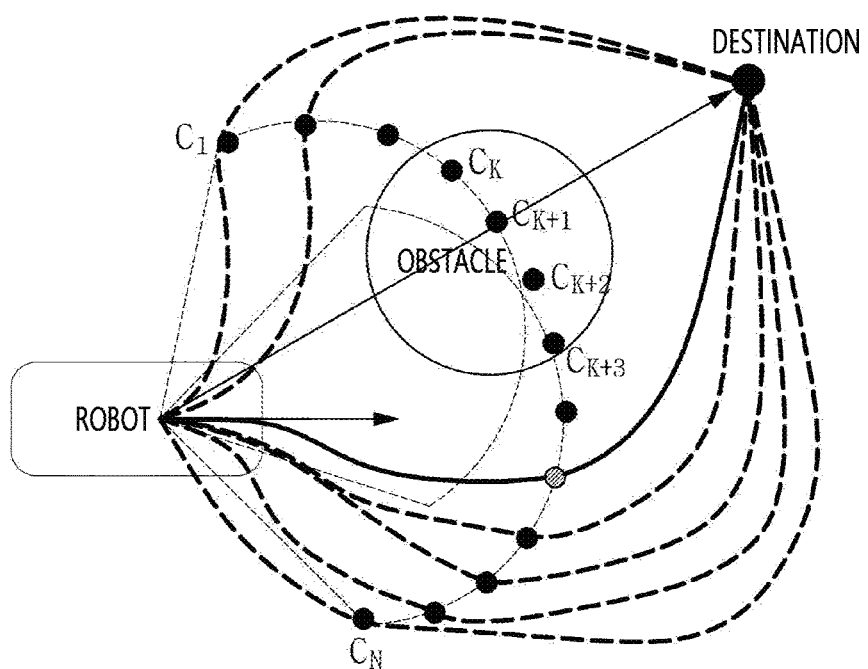

Selection of the collision avoidance destination candidate group may be performed in the following manner. FIGS. 9 and 10 are example diagrams showing a robot, a destination, and a collision avoidance destination point candidate. N candidate groups of collision avoidance destination points can be set at predetermined intervals on a fan-shaped arc having a radius d1 and having end angles of the smaller value of an angle obtained by subtracting an angle Δθ in the forward direction of the robot and an angle obtained by subtracting the angle Δθ in the direction connecting the robot and the destination and the larger value of an angle obtained by adding the angle Δθ in the forward direction of the robot and an angle obtained by adding the angle Δθ in the direction connecting the robot and the destination. The reason for giving this directionality to the selection of collision avoidance destination candidate group is that having a collision avoidance destination point in the direction in which the robot travels or the direction in which the robot toward the destination increases the possibility of adopting an optimal trajectory.

Among the collision avoidance destination point candidate group C1 to CN, the collision avoidance destination points Ck to (Ck+3) for which the trajectory up to the collision avoidance destination point collides with an obstacle cannot be a collision avoidance destination point (As will be described below, if a collision occurs from the collision avoidance destination to the destination, it is not excluded from the candidate and is considered in the collision cost).

Next, an optimal collision avoidance destination point should be determined. The cost of the trajectory passing through each collision avoidance destination point candidate is calculated, and the collision avoidance destination point candidate including the trajectory with the minimum cost is determined as the optimal collision avoidance destination point. A cost function of the trajectory can be calculated by multiplying the weight (W) by whether or not there is a collision with an obstacle from the collision avoidance destination to the destination (CC, 0 or 1), minimum value of the distance between the trajectory and the obstacle (CO), sum of curvatures of the trajectory (curvature is measured at multiple points that make up the trajectory) (Ccur), length of trajectory (Cd), etc., as shown in [Equation 1] below.

$$C_{total}=W_c C_c+W_o C_o+W_{cur} C_{cur}+W_d C_d \qquad \text{Equation 1}$$

Figure 11:
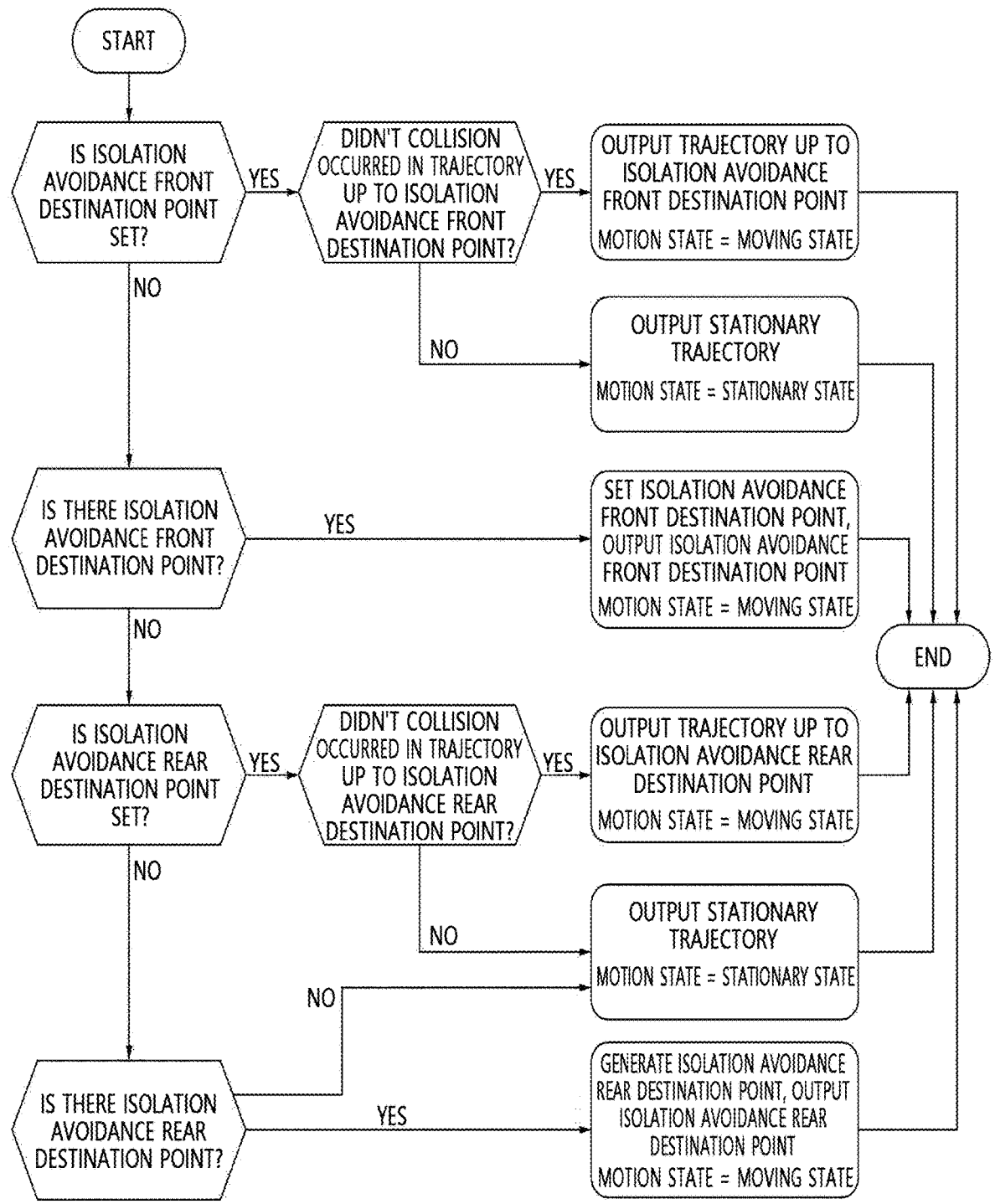
FIG. 11 is an algorithm for generating and setting an isolation avoidance destination point and a state of the robot related thereto.

Next, the isolation avoidance destination point is described. FIG. 11 shows the algorithm for generating and setting an isolation avoidance destination point and a state of the robot related thereto. As the term suggests, the isolation avoidance destination point is generated or set when the robot is in an isolated state. The isolation avoidance destination point is also generated by the trajectory generation module 163 in the avoidance trajectory generation step S80 of FIG. 6. The isolation avoidance destination point is divided into an isolation avoidance front destination point located in front of the robot and an isolation avoidance rear destination point located behind the robot, and the isolation avoidance front destination point is determined first. The reason is that, similar to the reason for giving this directionality in the selection of collision avoidance destination candidate group earlier, considering the direction in which the robot is traveling first increases the possibility of adopting the optimal trajectory. When the isolation avoidance front destination point has already been set by the trajectory generation module 163, if no collision occurs up to the isolation avoidance front destination point, the robot is in the moving state to the isolation avoidance front destination point along the trajectory. If the isolation avoidance front destination point is set but a collision occurs, the robot transitions to a stationary state. If the isolation avoidance front destination point is not set and can be generated, an isolation avoidance front destination point is generated and set, and the robot moves along that trajectory.

If the isolation avoidance front destination point is not set and cannot be generated, the isolation avoidance rear destination point should be considered. If the isolation avoidance rear destination point is set, the same processing as for the isolation avoidance front destination point is possible. If the isolation avoidance rear destination point is not set but can be generated, an isolation avoidance rear destination point can be generated and set, and the robot can move along that trajectory. If the isolation avoidance rear destination point is not set and cannot be generated, the robot will be in a stationary state.

In the case of the isolation avoidance front destination point, it is obtained using the same cost function as for the collision avoidance destination point. However, unlike in the case of the collision avoidance destination point, if a collision occurs from the isolation avoidance destination point up to the destination point when selecting the candidate group thereof, it is excluded from the candidate group.

In the case of the isolation avoidance rear destination point, N candidate isolation avoidance rear destination candidate groups can be generated at predetermined intervals behind the robot, that is, on a fan-shaped arc having (180°±Δθ) as both end angles and having a radius d2. In this case, it is desirable for the candidate group to have d2 smaller than or equal to the radius d1 of the fan-shaped arc considered in generating the collision avoidance destination point or isolation avoidance front destination point. This is because if isolation can be avoided with minimal backward moving, it is desirable to choose it.

The cost function for finding an optimal isolation avoidance rear destination point should include the cost (Cdir, 0 or 1) for the left and right backward movement directions as shown in [Equation 2] below. This is because if the cost of direction is not taken into account, it is possible to prevent the robots from making mirror-image movements when facing each other.

$$C_{total}=W_c C_c+W_o C_o+W_{cur} C_{cur}+W_d C_d+W_{dir} C_{dir} \qquad \text{Equation 2}$$

FIG. 12 shows a case where two robots face each other. When robot 1 and robot 2 face each other as shown in (a) of FIG. 12, if the cost for the right rear is set low in the cost function, both of two robots may move to their right rear as shown in (b) of FIG. 12, and when the two robots go straight again as shown in (c) of FIG. 12, they can avoid each other and move without facing each other. This is because if the cost of direction is not included, since the surrounding environment is similar, there is a high possibility that the two robots will face each other when both robots go up or both robots go down and go straight again, and this will put the robots in a state similar to isolation.

The cost function for finding the optimal isolation avoidance rear destination point is calculated including only the cost from the robot to the isolation avoidance rear destination point. That is, it is calculated without including the cost from the isolation avoidance rear destination to the destination. This is because the setting the isolation avoidance rear destination point is adopted as a last means in the present invention, and thus the purpose is to escape from the isolation state first without thinking about after the movement.

FIG. 13 is an example diagram showing the setting of the isolation avoidance destination point and the movement of the robot accordingly. If the robot is isolated by a box-shaped obstacle in front thereof, even if the isolation avoidance front destination point candidate group is generated as shown in (a) of FIG. 13, there is no isolation avoidance front destination point through which the robot can reach the destination without collision, and thus the robot generates isolation avoidance rear destination points as shown in (b) of FIG. 13. In this case, since the cost for the right rear is low, the robot escapes isolation to the right of the obstacle, as shown in (c) of FIG. 13. By setting a collision avoidance destination point or setting a destination (stationary) trajectory, the robot can avoid isolation and reach the destination, as shown in (d) of FIG. 13.

REFERENCE SYMBOLS LIST

110: motor
120: motor drive board
130: battery
140: power supply board
150: vision device
160: PC
161: state determination module
163: trajectory generation module
170: sensor
180: MCU board
S10: robot state determination step
S20: arrival determination step
S30: stationary trajectory generation step
S40: backward movement determination step
S50: backward movement trajectory generation step
S60: avoidance determination step
S70: destination trajectory generation step
S80: avoidance trajectory generation step

What is claimed is:

1. An autonomous driving mobile robot able to move by avoiding an obstacle, the autonomous driving mobile robot comprising:
   a motor;
   a motor drive board that controls the motor;
   a battery;
   a power supply board that controls the battery;
   a vision device that acquires surrounding vision data; and
   a PC that receives the vision data from the vision device 150, sets a route, generates operation commands, and thereby controls the motor drive board 120 and power supply board 140, wherein
   the PC is configured with a state determination module and a trajectory generation module,
   the state determination module performs an arrival determination step of determining whether the robot is at a location less than or equal to a first threshold distance from a destination is performed after performing a robot state determination step of determining a position and direction of the robot, and if the robot is located at the location less than or equal to the first threshold distance from the destination, the trajectory generation module performs a stationary trajectory generation step to generate a stationary trajectory where speed of the robot decreases and becomes zero as the robot approaches the destination,
   when it is determined that the robot is at a location exceeding a first threshold distance from a destination in the arrival determination step, the state determination module performs a backward movement determination step that determines a need for backward movement and whether a destination trajectory is generated up to a destination toward a rear of the robot, and when it is determined that the backward movement is needed and the destination trajectory is generated, the trajectory generation module performs a backward movement trajectory generation step to generate a backward trajectory, and
   when it is determined that there is no need for backward movement or in the backward movement determination step and the destination trajectory is not generated, the state determination module performs an avoidance determination step, and, if there is no trajectory along which it is able to reach the destination without colliding with an obstacle, the trajectory generation module performs an avoidance trajectory generation step to set a local destination point and generate an avoidance trajectory leading to the local destination point.

2. The autonomous driving mobile robot of claim 1, wherein
   N candidate groups of collision avoidance destination points that are set to avoid a collision with an obstacle among the local destination points are set at predetermined intervals on a fan-shaped arc having a radius d1 and having end angles of a smaller value of an angle obtained by subtracting an angle $\Delta\theta$ in a forward direction of the robot and an angle obtained by subtracting the angle $\Delta\theta$ in a direction connecting the robot and the destination and a larger value of an angle obtained by adding the angle $\Delta\theta$ in the forward direction of the robot and an angle obtained by adding the angle $\Delta\theta$ in the direction connecting the robot and the destination.

3. The autonomous driving mobile robot of claim 1, wherein
   an isolation avoidance destination point for resolving a robot's isolated state among the local destination points is composed of an isolation avoidance front destination point and an isolation avoidance rear destination point, and a cost for left and right backward movement directions is included in a cost function for finding an optimal isolation avoidance rear destination point among a candidate group of the isolation avoidance rear destination points.

* * * * *